(12) United States Patent
Simmonds

(10) Patent No.: US 7,777,819 B2
(45) Date of Patent: Aug. 17, 2010

(54) DISPLAY SOURCE

(75) Inventor: Michael David Simmonds, Ashford (GB)

(73) Assignee: BAE Systems plc, London (GB)

( * ) Notice: Subject to any disclaimer, the term of this patent is extended or adjusted under 35 U.S.C. 154(b) by 283 days.

(21) Appl. No.: 11/658,393

(22) PCT Filed: Oct. 18, 2006

(86) PCT No.: PCT/GB2006/050337

§ 371 (c)(1), (2), (4) Date: Jan. 25, 2007

(87) PCT Pub. No.: WO2007/054738

PCT Pub. Date: May 18, 2007

(65) Prior Publication Data

US 2009/0015735 A1   Jan. 15, 2009

(30) Foreign Application Priority Data

Nov. 10, 2005 (EP) .................................. 05270079
Nov. 10, 2005 (GB) .................................. 0522889.5

(51) Int. Cl.
　　*G02F 1/1335* (2006.01)
　　*G02B 27/14* (2006.01)
　　*G09G 5/00* (2006.01)
(52) U.S. Cl. .............................. 349/11; 359/630; 345/7
(58) Field of Classification Search ................... 349/11; 359/630

See application file for complete search history.

(56) References Cited

U.S. PATENT DOCUMENTS 5,546,227 A    8/1996    Yasugaki et al.
5,984,477 A *  11/1999   Weissman et al. ............. 353/28
6,195,206 B1   2/2001    Yona et al.
6,333,820 B1   12/2001   Hayakawa et al.
2003/0165013 A1  9/2003  Doany et al.

FOREIGN PATENT DOCUMENTS

EP    1 538 477 A1 *  6/2005
WO    WO 96/36898      11/1996
WO    WO 01/81978 A1   11/2001

* cited by examiner

*Primary Examiner*—Uyen-Chau N Le
*Assistant Examiner*—Kajli Prince
(74) *Attorney, Agent, or Firm*—Scully, Scott, Murphy & Presser, P.C.

(57) ABSTRACT

A helmet mounted display 30 includes a display source 31 arranged to be directly imaged by a primary relay optical arrangement 32 having relay optical elements 33A, 33B and 33C. Light exiting the primary relay optical arrangement 32 indicated by ray traces 34A, 34B and 34C continue towards a visor 35 which is arranged to reflect incident light to a exit pupil located in a convenient position for a viewer 36.

The display source 31 includes a light source, beam splitter, reflective liquid crystal display and a display source relay optical arrangement to provide an output image at an output diffuser screen. The image at the output screen is then directly imaged by the primary relay optical arrangement 32.

Should the reflective liquid crystal display require modification or replacement with a newer model, then the display source 31 can be redesigned to accommodate the new reflective liquid crystal display rather than re-engineering the primary relay optical arrangement 32 at greater expense.

15 Claims, 2 Drawing Sheets

DISPLAY SOURCE

BACKGROUND OF THE INVENTION (1) Field of the Invention

This invention relates to a display source which is particularly, but not exclusively, suitable for use in a helmet mounted display or head mounted display.

(2) Description of Related Art

Traditional, as illustrated in FIG. 1, a prior art helmet mounted display 1 can be constructed to directly image a transmissive digital display device 2 using only primary relay optical elements 3a, 3b and 3c to transmit light generated by the digital display device 2 onto a visor 4, which is arranged to reflect light back to an exit pupil at the point of a viewer 5. It will be understood that the viewer 5 observes a forward scene through the visor 4 and the image produced by the digital display device 2 is superimposed upon the forward scene. The problem with this approach is that transmissive digital display devices 2 have an inherent drop in contrast related to the angle of incidence between the transmissive digital display device 2 and the primary relay optical elements 3a to 3c. Accordingly, light on axis to the transmissive digital display device 2, indicated by ray trace 6, provides good contrast at the point of the viewer 5. However, light off axis, indicated by ray traces 7 and 8, have a larger angle of incidence than light on axis ray trace 6 and therefore provide poorer contrast at the point of the viewer 5. Helmet mounted display primary relay optical elements 3a to 3c, by nature, provide a large numerical aperture and hence require a large angle of incidence to be present at the transmissive digital display device 2. This in turn leads to large variations in contrast for the head mounted display at the exit pupil at the point of the viewer 5.

FIG. 2, illustrates a way of improving the contrast for a helmet mounted display 10 according to the prior art using a reflective digital display device 11, a beam splitter 12 and an illumination source 13 rather than the transmissive digital display device 2 of FIG. 1. In operation, light from the illumination source 13 passes through illumination optic elements 14 and 15 prior to entering the beam splitter 12 for reflection within the beam splitter 12 to the reflective digital display device 11. Light incident on the reflective digital display device 11 can either be reflected so as to pass back through the beam splitter 12 to be directly imaged by primary relay optical elements 16A, 16B and 16C or to be prohibited from passing through the beam splitter 12. Light allowed to pass back through beam splitter 12 and hence the primary relay optical elements 16A to 16C, as indicated by on axis ray trace 17 and off axis ray traces 18 and 19, is incident on a visor which is arranged to reflect the light to an exit pupil for viewing by a viewer 21.

However, to use a reflective digital display device 11 in such a manner so to be directly imaged by the primary relay optical elements 16A to 16C requires a large beam splitter 12 and associated illumination optics 14 and 15 with a separate illumination source 13 to provide the required sized exit pupil to a viewer 21. This would require modification of the complex primary relay optical elements 16A to 16C to accommodate a large back focal length to allow room for the beam splitter 12, illumination source 13 and illumination optic elements 14 and 15.

Furthermore, directly imaging a digital display device 2 or 11 as described and illustrated either in FIG. 1 or 2, means that the primary relay optical elements 3a to 3c of FIG. 1 or 16a to 16c of FIG. 2 can only be designed for a specific digital display device 2 or 11. The primary relay optical elements 3a to 3c or 16a to 16c have a fixed focal length and any change in digital display device 2 or 11, for example size, will severely impact the optical performance of the helmet mounted display 1 or 10. That is, if the size of the digital display device 2 or 11 is decreased then the field of view presented at the exit pupil for a viewer 5 or 21 will be lost. Conversely, if the size of the digital display device 2 or 11 is increased, then display pixels around the periphery of the digital display device 2 or 11 will be wasted resulting in a lower resolution as viewed by a viewer 5 or 21 at the exit pupil. As is well known, the technology in digital display devices 2 or 11 is rapidly advancing and hence such digital display devices 2 or 11 quickly become redundant and superseded, thus it would be necessary to redesign the primary relay optical elements 3a to 3c or 16a to 16c of the helmet mounted display 1 or 10 each time a digital display device 2 or 11 became redundant.

BRIEF SUMMARY OF THE INVENTION

According to a first aspect of the present invention, a display source includes a light source generator arranged to generate light including linearly polarised light of a first predetermined type, a beam splitter being arranged to substantially transmit incident linearly polarised light of the first predetermined type through the beam splitter and to substantially reflect incident linearly polarised light of a second predetermined type from the beam splitter, an image generator including a plurality of display pixels, each pixel including a predetermined state being arranged to reflect and convert incident linearly polarised light of the first predetermined type into linearly polarised light of the second predetermined type, a display source relay optical arrangement, an output screen arrangement and the display source relay optical arrangement being arranged to transmit linearly polarised light of the second predetermined type reflected from the image generator via the beam splitter to the output screen arrangement.

Preferably, the light source generator may include a light source and an illuminator lens.

Advantageously, the image generator may include a reflective liquid crystal display. A field lens may be arranged between the reflective liquid crystal display and the beam splitter.

Preferably, the predetermined state of the display pixels of the image generator may reflect and convert incident linearly polarised light of the first predetermined type into linearly polarised light of the second predetermined type to form a desired image to be displayed on the output screen arrangement.

The linearly polarised light of the first predetermined type may be p-polarised light. The linearly polarised light of the second predetermined type may be s-polarised light.

Advantageously, the display source relay optical arrangement may include a relay lens arrangement. Preferably, a fold mirror may be arranged between the relay lens arrangement and the output screen arrangement.

Preferably, a compensator plate may be arranged between the beam splitter and display source relay optical arrangement. Alternatively, a compensator plate may be arranged between the reflective liquid crystal display and field lens.

Advantageously, the relay lens arrangement may include a first singlet lens, a first doublet lens, a second singlet lens and a second doublet lens arranged in series with respect to one another.

The output screen arrangement may include an output diffuser. Preferably, a field lens may be arranged between the output diffuser screen and the screen display source relay optical arrangement.

According to a second aspect of the invention, a helmet mounted display or a head mounted display including a display source includes a primary relay lens arrangement and a visor, the primary lens arrangement arranged to transmit light from the output screen arrangement to the visor and the visor arranged to reflect incident light to a viewer.

Preferably, the helmet mounted display or the head mounted display may include a projector lens arranged between the display source and the primary relay lens arrangement.

According to another aspect of the invention, a helmet mounted display or head mounted display includes a primary relay lens arrangement and a visor, the helmet mounted display or head mounted display further includes a display source, the display source being arranged to provide image bearing light to the primary relay lens arrangement which in turn is arranged to transmit the image bearing light to the visor, the display source also being interchangeable with a replacement display source without the need to alter the primary relay lens arrangement of the helmet mounted display or head mounted display.

In this manner, should it be necessary to replace the image generator of the display source with a different type of image generator, then it will only be necessary to redesign the arrangement of the display source, rather than the primary relay optical arrangement of the helmet mounted display or head mounted display. It will be understood that redesigning the primary relay optical arrangement of the helmet mounted display or head mounted display will incur a relatively large cost when compared to redesigning the display source, especially when one considers the speed at which advances are made in the development of image generators and that such devices can quickly become superseded. The primary relay optical arrangement for a helmet mounted display or head mounted display will have a fixed focal length and any change in size of the image generator will impact the optical performance of the primary relay optical arrangement. That is, if there is an increase in size of the image generator, then display pixels of the image generator will exist outside of the usable area as constrained by the primary relay optical arrangement, which will result in a lower resolution as observed by a viewer using the helmet mounted display or head mounted display. Conversely, if the image generator is reduced in size, then the constrains of the primary relay optical arrangement will result in a lost of field of view as observed by a viewer using the helmet mounted display or head mounted display. A redesign of the display source relay optical arrangement is cheaper and can be implemented so as to provide a correctly sized image to the primary relay optical arrangement of the helmet mounted display or head mounted display.

BRIEF DESCRIPTION OF THE DRAWINGS

The invention will now be described, by way of example only, with reference to the accompanying drawings, in which.

DETAILED DESCRIPTION OF THE INVENTION

Figure 1:
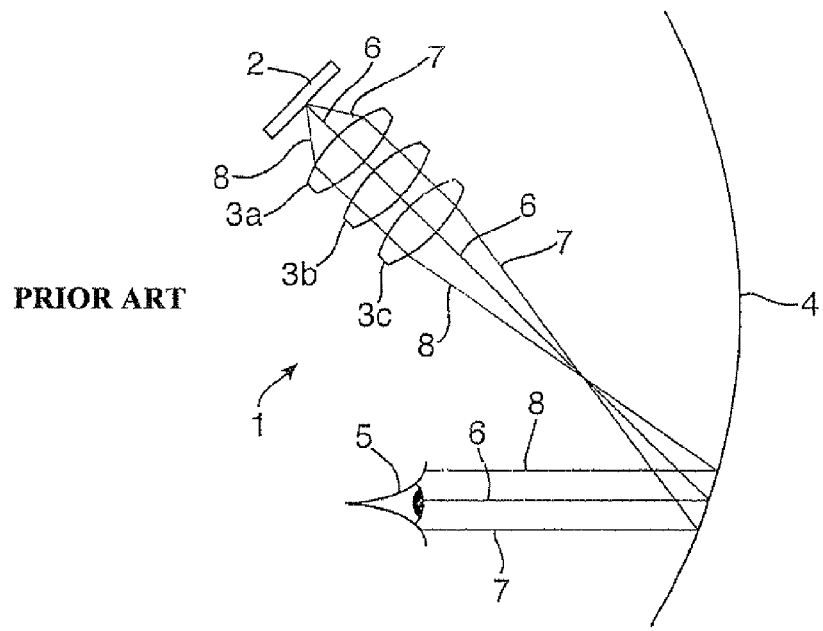
FIG. 1 illustrates a prior art helmet mounted display in which a transmissive digital display device is directly imaged by the primary relay optical elements of the helmet mounted display.
Figure 2:
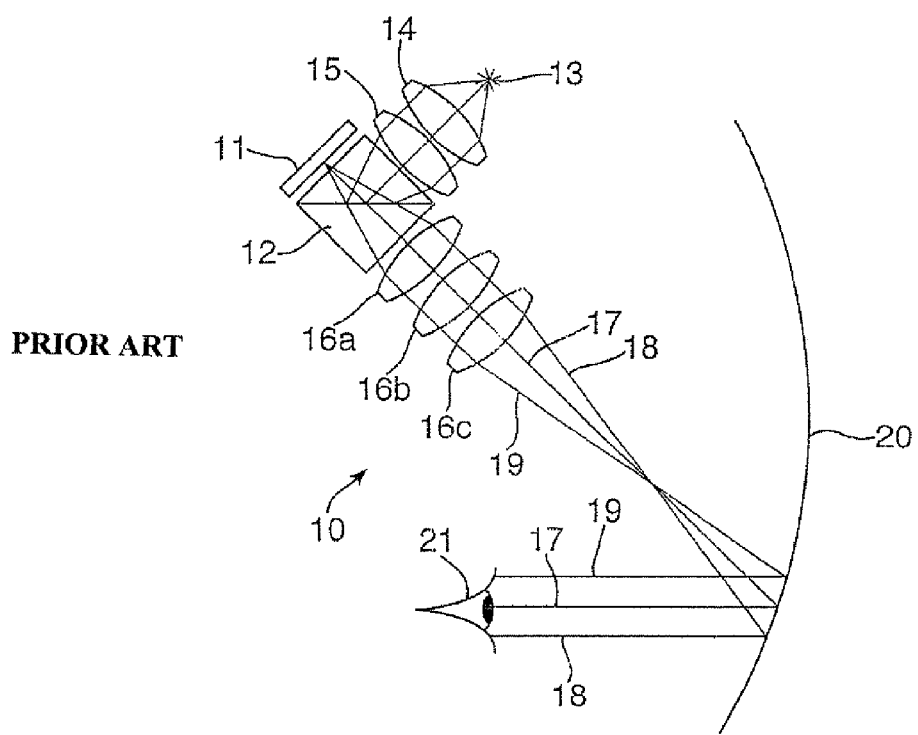
FIG. 2 illustrates a prior art helmet mounted display wherein a reflective digital display device is directly imaged by the primary relay optical elements of the helmet mounted display.

This invention provides a different philosophy to that of the prior art described with reference to FIGS. 1 and 2. In general, a primary relay optical arrangement of a helmet mounted display or a head mounted display is very complex and an expensive item to produce. If the primary relay optical arrangement were arranged to directly image a digital display device, then the primary relay optical arrangement would need to be a bespoke design suited to the specific digital display device utilised in the helmet mounted display or head mounted display. Any change in the mechanical or optical properties of the digital display device could render the entire helmet mounted display or head mounted display system obsolete. Therefore, a display source is employed in the invention to be directly imaged by the primary relay optical arrangement and that can be redesigned relatively simply and cheaply if the digital display device for the helmet mounted display or head mounted display needs to be changed. It will be noted that the primary relay optical arrangement of the helmet mounted display or head mounted display remains the same and hence does not require expensive and complex changes. Accordingly, the helmet mounted display or head mounted display is not rendered obsolete by variations in the digital display device employed to provide the image at the output of the display source.

Figure 3:
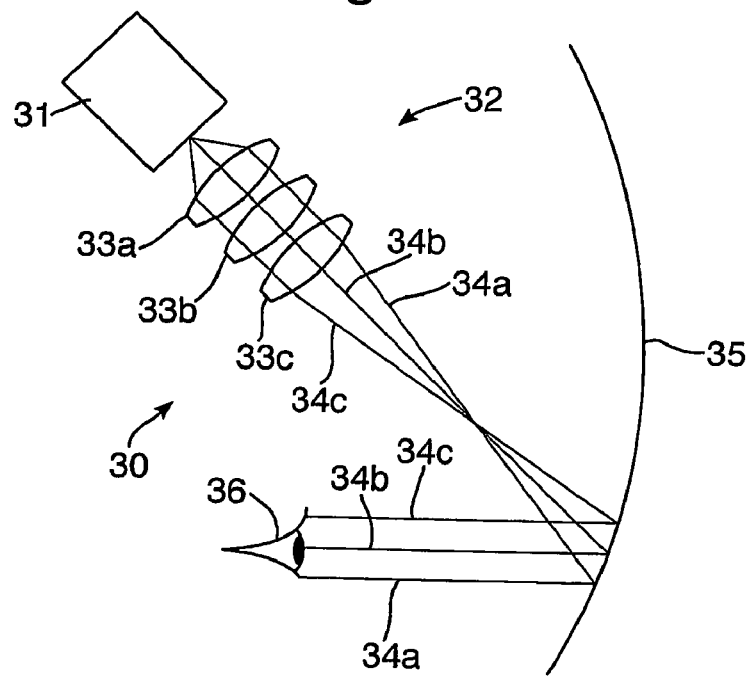
FIG. 3 is a schematic illustration of a helmet mounted display incorporating a display source according to an embodiment of the present invention.

Referring to FIG. 3, a helmet mounted display 30 includes a display source 31 arranged to be directly imaged by a primary relay optical arrangement 32 comprises primary relay optical elements 33A, 33B and 33C.

Light exiting the primary relay optical arrangement 32 indicated by ray traces 34A, 34B and 34C continue on towards a visor 35 of the helmet mounted display 30 which is arranged to reflect incident light to an exit pupil located in a convenient position for a viewer 36 utilising the helmet mounted display 30 such that the viewer 36 observes a forward scene through the visor 35 and the image provided by the display source 31 is superimposed upon the forward scene.

Figure 4:
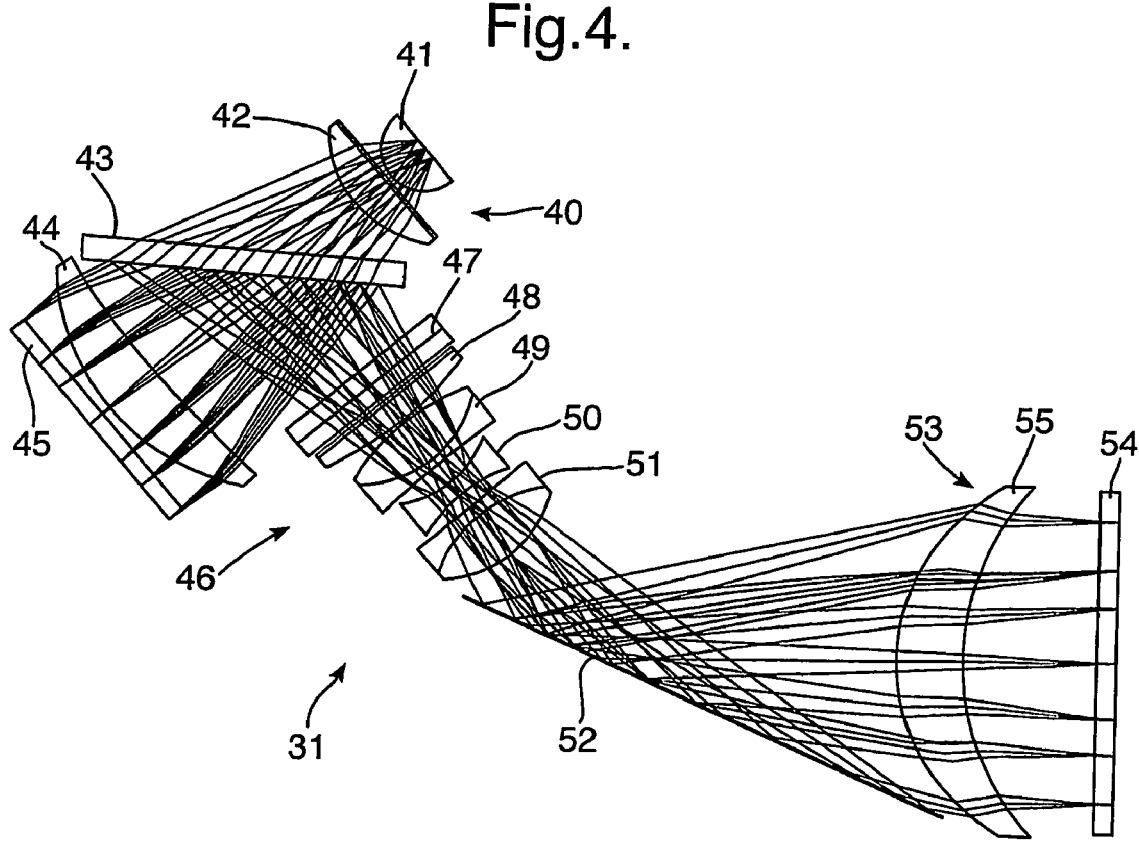
FIG. 4 is a detailed illustration of a display source according to an embodiment of the present invention.

Referring to FIG. 4, the display source 31 in detail includes a light source generator 40 including a light source 41, which can be a lumiled high brightness five watt light emitting diode with an integral lens, not shown, and an illuminator lens 42. The illuminator lens 42 can be a plano-convex lens, which is arranged to allow a large angle cone of light to be collected from the light source 41 to provide a brighter image throughout the display source 30. It is to be noted that this embodiment of the invention is designed to generate a daylight luminescence display at the exit pupil of the helmet mounted display 30.

Light exiting the illuminator lens 42 passes to a beam splitter 43, for example a wire grid polarising beam splitter, which is arranged to be highly transmissive to linear p-polarised incident light received from the illuminator lens 42 and highly reflective to other incident light including incident linear s-polarised light received from the illuminator lens 42. Therefore, in this embodiment the randomly polarised light collected by the illuminator lens 42 from the light source 41 is polarised by the beam splitter 43. That is, only p-polarised light is transmitted through the beam splitter 43 and all other polarisation states of light, for example s-polarised light, are reflected away from the beam splitter 43. It will be understood that the beam splitter 43 is not perfect and that it is possible that the beam splitter 43 can reflect p-polarised light rather than transmit the p-polarised light through the beam splitter 43. Equally, the beam splitter 43 can be transmissive rather than reflective to other than p-polarised light.

P-polarised light transmitted through the beam splitter 43 is then incident on a field lens 44 which is arranged to roughly collimate the light and to illuminate a reflective liquid crystal display 45. The field lens 44 is arranged to illuminate the reflective liquid crystal display 45 and can be a meniscus lens.

The reflective liquid crystal display 45 is arranged to generate a display object to be formed at the output of the light source generator 40. Any selected pixels in an activated state are arranged to rotate the polarisation of the incident p-polarised light such that reflected light from an active pixel is transformed into the s-polarisation state. Hence, reflected light from the reflective liquid crystal display 45 passes back through to field lens 44 to the beam splitter 43.

S-polarised light incident on the reflective liquid crystal display 45 is reflected by the beam splitter 43 to a display source relay optical arrangement 46 via a compensator plate 47. Accordingly, any p-polarised light reflected to the beam splitter 43 is transmitted through the beam splitter 43 and not to the display source relay optical arrangement 46. The compensator plate 47 is arranged to correct any drop in contrast due to changes in angle of incidence across the beam splitter 43 so as to improve the contrast of the final display from the display source 31. Alternatively, the compensator plate 47 can be positioned between the reflective liquid crystal display 46 and the field lens 44 to perform the same task.

The display source relay optical arrangement 46 includes a first singlet lens 48, a first doublet lens 49, a second singlet lens 50 and a second doublet lens 51 arranged in series with respect to one another and in the pathway of light exiting the compensator plate 47 and are arranged to correct aberration and relay light from the compensator plate 47 towards the output of the display source 31. First singlet lens 48 is a plano-convex lens arranged as a substrate for cleaning up linear s-polarised light reflected from the beam splitter 43. The first singlet lens 48 acts to remove any orthogonal polarisation of light that may have leaked through the beam splitter 43 and would otherwise reduce image contrast. First doublet lens 49 is arranged to colour correct the image reflected by the beam splitter 43. It is to be noted that the entire optical design of the display source 31 of this embodiment is arranged to be colour corrected over the visible spectrum. This accommodates the spectral bandwidth of the light source 41 and also allows the use of colour reflective liquid crystal displays 45. Second singlet lens 50 is a bi-concave lens forming part of the imaging optics for the display source 31. Second doublet lens 51 is a colour correcting doublet lens forming part of the imaging optic for the display source 31.

It will be understood, that although this embodiment of the invention utilizes four lenses, 48, 49, 50 and 51, that the display source relay optical arrangement 46 can comprise other arrangements to provide the correct image at the output of the display source 31.

Light exiting display source relay optical arrangement 46 then proceeds to a fold mirror 52, which is arranged to reflect the light to an output screen arrangement 53. It will be understood, that the present display source 31 has been specifically designed to fit a particular helmet mounted display 30 system. Use of a fold mirror 52 in the optical path of the light can allow the display source 31 to be fitted between an inner helmet shell and a helmet module with minimal mechanical interference.

The output screen arrangement 53 includes an output diffuser screen 54 and a field lens 55 arranged between the output diffuser screen 54 and the display source relay optical arrangement 46. The field lens 55 ensures that the image at the output diffuser screen 54 is telecentric to allow matching of the numerical aperture of the display source relay optical arrangement 46 to be best matched to the numerical aperture of the primary relay optical arrangement 32 of the helmet mounted display 30. This gives the best display brightness to the eye of a viewer 36. Output diffuser screen 54 is arranged to increase the small numerical aperture of the display source relay optical arrangement 46 so as to match the numerical aperture of the intended primary relay optical arrangement 32 of the helmet mounted display 30.

Accordingly, the display source 31 uses a small numerical aperture display source relay optical arrangement 46 to image the reflective liquid crystal display 45, thereby allowing a relatively small and cheap display source relay optical arrangement 46 to be used in conjunction with an output diffuser screen 54 to generate the required numerical aperture at the focal point of a primary relay optical arrangement 32 so as to be directly imaged by the primary relay optical arrangement 32. This approach is far simpler than integrating a small display source 31 directly into the primary relay optical arrangement 32. This also allows for the obsolescent nature of the reflective liquid crystal display 54 over time. The exit pupil of the helmet mounted display 30 as seen by a viewer 37 does not suffer from large contrast variations as the reflective liquid crystal display 45 is not directly imaged. The illumination of the reflective liquid crystal display 45 is carefully designed such that sufficient light is collected from the light source 41 to provide a display having a luminance bright enough for daytime use of the helmet mounted display 30.

In this manner, should it be necessary to replace the image generator of the display source with a different type of image generator, then it will only be necessary to redesign the arrangement of the display source, rather than the primary relay optical arrangement of the helmet mounted display or head mounted display. It will be understood that redesigning the primary relay optical arrangement of the helmet mounted display or head mounted display will incur a relatively large cost when compared to redesigning the display source, especially when one considers the speed at which advances are made in the development of image generators and that such devices can quickly become superseded. The primary relay optical arrangement for a helmet mounted display or head mounted display will have a fixed focal length and any change in size of the image generator will impact the optical performance of the primary relay optical arrangement. That is, if there is an increase in size of the image generator, then display pixels of the image generator will exist outside of the usable area as constrained by the primary relay optical arrangement, which will result in a lower resolution as observed by a viewer using the helmet mounted display or head mounted display. Conversely, if the image generator is reduced in size, then the constrains of the primary relay optical arrangement will result in a lost of field of view as observed by a viewer using the helmet mounted display or head mounted display. A redesign of the display source relay optical arrangement is cheaper and can be implemented so as to provide a correctly sized image to the primary relay optical arrangement of the helmet mounted display or head mounted display.

Although the invention has been described with reference to a helmet mounted display, it will be understood that the invention can also be incorporated within a head mounted display and that such a display source 31 can be used in a helmet mounted display or head mounted display system.

It will be noted that such a display source 31 can be used in a helmet mounted display or head mounted display as a cathode ray tube replacement. In this manner, the helmet mounted display or head mounted display can be rendered lighter and/or more compact.

The invention claimed is:

1. A method of modifying a display apparatus by replacing in the display apparatus a first reflective image generator having first mechanical or optical properties with a second reflective image generator having second mechanical or optical properties, the display apparatus including:
   a primary relay lens arrangement having a fixed focal length;
   a visor;
   a display source arranged to image the primary relay lens arrangement;
   wherein the primary relay lens arrangement is arranged to transmit the image from the display source to the visor; and
   wherein the display source includes:
      a first image generator arranged to generate an image; and
      a first display source relay optical arrangement;
   wherein the first image generator is arranged to image the first display source relay optical arrangement; and
   the first display source relay optical arrangement has a first focal length which is selected according to the first mechanical or optical properties to transmit a correctly sized image to the primary relay lens arrangement;
   the method comprising:
      replacing the first image generator with a second different image generator; and
      replacing the first display source relay optical arrangement with a second different display source relay optical arrangement having a second different focal length which is selected according to the second different mechanical or optical properties to transmit a correctly sized image to the primary relay lens arrangement, and
   wherein the display apparatus further comprises a first output screen arrangement for matching a first numerical aperture of the first display source relay optical arrangement with a numerical aperture of the primary relay lens arrangement, the method comprising replacing the first output screen arrangement with a second different output screen arrangement which matches a second different numerical aperture of the second different display source relay optical arrangement with the numerical aperture of the primary relay lens arrangement.

2. A method, as in claim 1, wherein the image generator includes a reflective liquid crystal display.

3. A method, as in claim 2, wherein a field lens is arranged between the reflective liquid crystal display and the beam splitter.

4. A method, as in claim 1, wherein the display source relay optical arrangement includes a relay lens arrangement.

5. A method, as in claim 4, wherein a fold mirror is arranged between the relay lens arrangement and the output screen arrangement.

6. A method, as in claim 1, wherein the display apparatus includes:
   a light source generator arranged to generate light including linearly polarized light of a first predetermined type;
   a beam splitter arranged to substantially transmit incident linearly polarized light of the first predetermined type through the beam splitter and to substantially reflect incident linearly polarized light of a second predetermined type from the beam splitter; and
   the image generators include a plurality of display pixels, each pixel including a predetermined state being arranged to reflect and convert incident linearly polarized light of the first predetermined type into linearly polarized light of the second predetermined type;
   wherein the first and the second display source relay optical arrangements are arranged to transmit linearly polarized light of the second predetermined type reflected from the image generator via the beam splitter to the output screen arrangement.

7. A method, as in claim 6, wherein the light source generator includes a light source and an illuminator lens.

8. A method, as in claim 6, wherein the image generator includes a reflective liquid crystal display.

9. A method, as in claim 6, wherein the predetermined state of the display pixels of the image generator reflect and convert incident linearly polarized light of the first predetermined type into linearly polarized light of the second predetermined type to form a desired image to be displayed on the output screen arrangement.

10. A method, as in claim 6, wherein the linearly polarized light of the first predetermined type is p-polarized light.

11. A method, as in claim 6, wherein the linearly polarized light of the second predetermined type is s-polarized light.

12. A method, as in claim 6, wherein a compensator plate is arranged between the beam splitter and display source relay optical arrangement.

13. A method as in claim 6, wherein said method is applied to a display apparatus.

14. A method as in claim 13, wherein the display apparatus is provided in a helmet mounted display or head mounted display including a visor arranged to reflect incident light to a viewer.

15. A method as in claim 14, wherein the helmet mounted display or head mounted display further includes a projector lens arranged between the display source and the primary relay lens arrangement.

* * * * *